(12) United States Patent
Wang et al.

(10) Patent No.: US 11,889,096 B2
(45) Date of Patent: Jan. 30, 2024

(54) VIDEO CODEC ASSISTED REAL-TIME VIDEO ENHANCEMENT USING DEEP LEARNING

(71) Applicant: INTEL CORPORATION, Santa Clara, CA (US)

(72) Inventors: Chen Wang, San Jose, CA (US); Ximin Zhang, San Jose, CA (US); Huan Dou, Beijing (CN); Yi-Jen Chiu, San Jose, CA (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 16/914,083

(22) Filed: Jun. 26, 2020

(65) Prior Publication Data

US 2020/0327702 A1    Oct. 15, 2020

(51) Int. Cl.
| | |
|---|---|
| G06T 9/00 | (2006.01) |
| G06T 3/40 | (2006.01) |
| H04N 19/44 | (2014.01) |
| H04N 19/30 | (2014.01) |
| G06N 3/08 | (2023.01) |
| H04N 19/159 | (2014.01) |
| H04N 19/184 | (2014.01) |
| H04N 19/176 | (2014.01) |
| H04N 19/132 | (2014.01) |

(Continued)

(52) U.S. Cl.
CPC ........... *H04N 19/44* (2014.11); *G06F 18/251* (2023.01); *G06N 3/08* (2013.01); *G06T 3/4007* (2013.01); *G06T 3/4053* (2013.01); *G06T 9/002* (2013.01); *G06V 10/82* (2022.01); *H04N 19/132* (2014.11); *H04N 19/159* (2014.11); *H04N 19/176* (2014.11); *H04N 19/184* (2014.11); *H04N 19/30* (2014.11)

(58) Field of Classification Search
CPC .... H04N 19/44; H04N 19/132; H04N 19/159; H04N 19/176; H04N 19/184; H04N 19/30; G06V 10/82; G06F 18/251; G06N 3/08; G06T 3/4007; G06T 3/4053; G06T 9/002
See application file for complete search history.

(56) References Cited

U.S. PATENT DOCUMENTS 10,701,394 B1 * 6/2020 Caballero ............. G06N 3/045
10,779,002 B2 * 9/2020 Chen .................... H04N 19/176
(Continued)

OTHER PUBLICATIONS

Zhihao Wang, Deep Learning for Image Super-Resolution: A Survey, 2020, IEEE Transaction on Pattern Analysis and Machine Intelligence, vol. 43, No. 10 (Year: 2020).*
(Continued)

*Primary Examiner* — Gregory M Desire
(74) *Attorney, Agent, or Firm* — Essential Patents Group, LLP

(57) ABSTRACT

Techniques related to accelerated video enhancement using deep learning selectively applied based on video codec information are discussed. Such techniques include applying a deep learning video enhancement network selectively to decoded non-skip blocks that are in low quantization parameter frames, bypassing the deep learning network for decoded skip blocks in low quantization parameter frames, and applying non-deep learning video enhancement to high quantization parameter frames.

20 Claims, 8 Drawing Sheets

(51) Int. Cl.
    *G06F 18/25*     (2023.01)
    *G06V 10/82*     (2022.01)

(56) References Cited

U.S. PATENT DOCUMENTS

| | | | |
|---|---|---|---|
| 11,228,767 B2 * | 1/2022 | Hannuksela | H04N 19/30 |
| 11,354,575 B1 * | 6/2022 | Goodall | G06T 7/90 |
| 11,363,302 B2 * | 6/2022 | Su | H04N 19/82 |
| 11,528,493 B2 * | 12/2022 | Bae | H04N 19/159 |
| 11,671,632 B2 * | 6/2023 | Malakhov | H04N 19/167 |
| | | | 375/240.12 |
| 11,689,726 B2 * | 6/2023 | Mukherjee | H04N 19/463 |
| | | | 375/240.22 |

OTHER PUBLICATIONS

Extended European Search Report for European Patent Application No. 20213853.3, dated Jun. 8, 2021.

Li, Y., et al., "Convolutional Neural Network-Based Block Up-sampling for Intra Frame Coding", Cornell University Library, Feb. 22, 2017.

Lin, J., et al., "Convolutional Neural Network-Based Block Up-Sampling for HEVC", IEEE Transactions on Circuits and Systems for Video Technology, vol. 29, No. 12, Dec. 1, 2019, pp. 3701-3715.

Zhang, Z , et al. , "FAST: A Framework to Accelerate Super-Resolution Processing on Compressed Videos", 2017 IEEE Conference on Computer Vision and Pattern Recognition Workshops (CVPRW), Jul. 21, 2017, pp. 1015-1024.

* cited by examiner

US 11,889,096 B2

VIDEO CODEC ASSISTED REAL-TIME VIDEO ENHANCEMENT USING DEEP LEARNING

BACKGROUND

In deep learning super-resolution, video is upscaled using deep learning networks such as convolutional neural networks trained using training video and ground truth upscaled video. Current deep learning-based video super-resolution (i.e., video upscaling) requires significant computation resources and memory bandwidth to achieve real-time performance (e.g., 1080p to 4K upscaling at 60 fps). Such requirements prohibit its wide deployment on many hardware platforms that have limited resources or stringent power budgets, such as laptops and tablets that only include integrated graphics.

Techniques to accelerate deep learning-based video super-resolution including simplifying the network topology of the employed deep learning network. This includes reducing the number of layers, the number of channels, the number of connections between two consecutive layers, and the bit-precision to represent the weight and activation of the network. Other techniques use low rank approximation to reduce the complexity of the most computation-intensive layers (e.g., convolution and fully connected layer). Finally, some networks reduce complexity by seeking temporal correlations via another neural network, which predicts per-pixel motion vectors.

Complexity reduction techniques reduce the number of layers, channels, and/or bit-precision for improved speed but the quality of video super-resolution is also sacrificed. Notably, a super-resolution network needs to be "deep" enough (i.e., maintaining at least a minimum amount of network layers/channels/bit-precision) to show noticeable quality improvement over traditional methods such as bicubic or Lanczos interpolation. The requirement of a deep network for improved upsampling quality performance limits the complexity that can be reduced. The same issues persist for low rank approximation techniques. Finally, for temporal-based neural networks, as the motion vectors between two frames are computed by another computationally and memory expensive network, the computation saving is very limited.

It may be advantageous to provide deep learning based super-resolution for video that improves super-resolution quality and/or provides acceleration, reduced computational complexity, and memory cost. It is with respect to these and other considerations that the present improvements have been needed. Such improvements may become critical as the desire to upscale video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
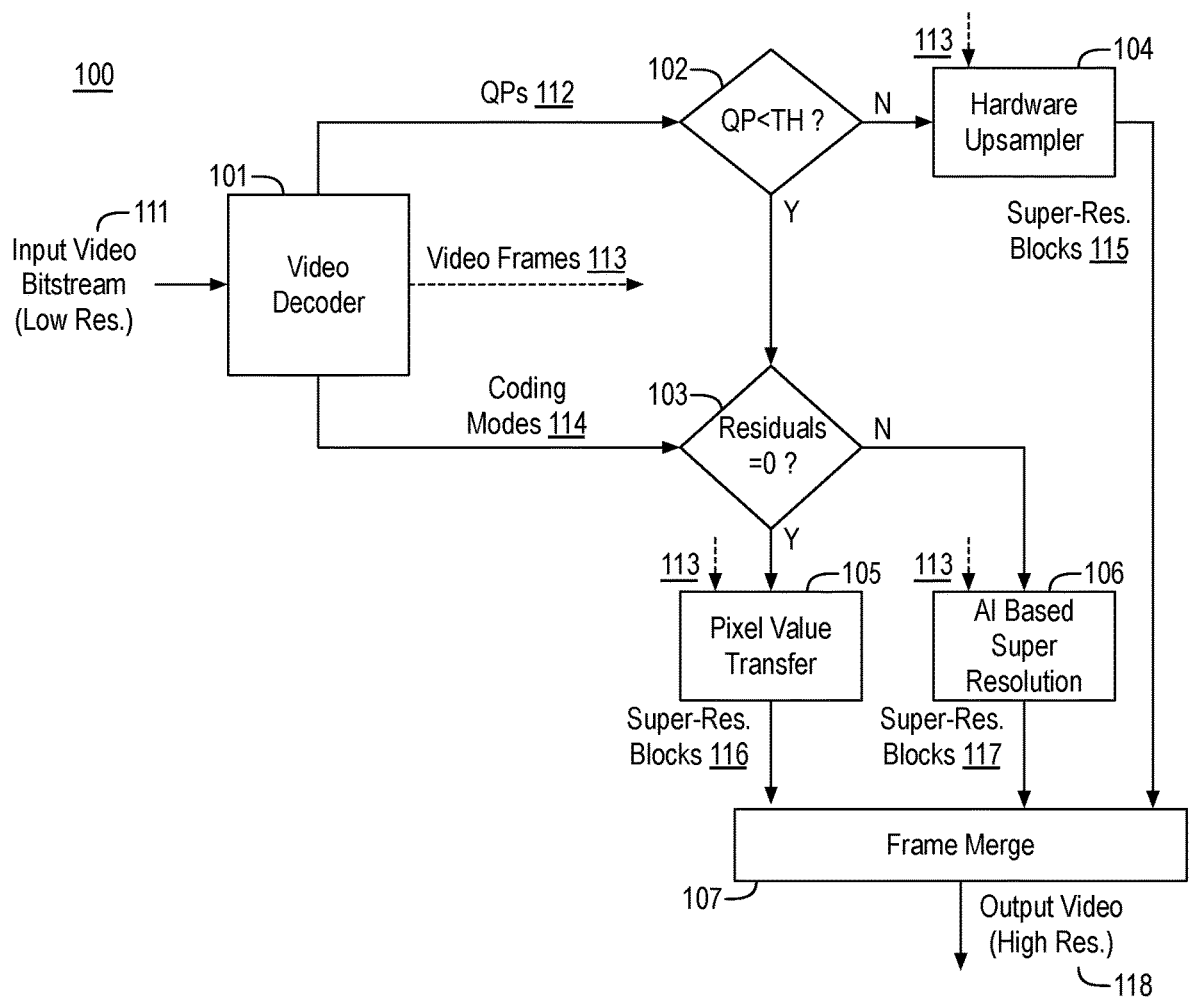
FIG. 1 is an illustrative diagram of an example system for processing via selective application of a deep learning network.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to real-time super-resolution for video and, in particular, to accelerating deep learning-based video super-resolution using metadata available from decode of the video.

In many contexts, it is desirable to apply super-resolution processing to video to upscale and, optionally, improve the details of lower resolution video to provide higher resolution video or provide other enhancement processing to video. As used herein, the term super-resolution indicates upscaling from a lower resolution to a higher resolution. The term resolution or size, which are used interchangeably, indicate a width by height of a video frame in pixels (or other suitable measure) with greater resolutions including greater numbers of pixels in the horizontal dimension, vertical dimension, or both. Resultant upscaled or super-resolution video or other enhanced video may be used in any application such as display to a user, artificial intelligence applications, etc. For example, the resultant upscaled or super-resolution video may be presented to a user, provided to another application, or stored to memory for future use either at the device performing the super-resolution or at a remote device.

The techniques discussed herein provide a framework to accelerate any deep learning-based video enhancement. For example, a deep learning video enhancement network having any topology may be employed herein. The deep learning-based video enhancement network may be simplified (e.g., having a reduced number of layers, number of channels, number of connections between two consecutive layers, and/or bit-precision) or not. As used herein, the term deep learning network or deep learning-based video enhancement indicates a network that implements machine learning using an artificial neural network having several layers between an input layer and an output layer of the network including deep neural network, convolutional neural networks, or the like. In some embodiments, the deep learning network includes a number of convolutional neural network layers. In some embodiments, the deep learning network is a convolutional neural network (CNN). As used herein, the term CNN includes any network employing one or more convolutional layers as a part of the network. The term convolutional layer indicates a layer employing a number of convolutional filters and optionally including a ReLU layer or a pooling layer. The discussion herein focuses on super-resolution applications for the sake of clarity of presentation but any video enhancement including super-resolution, anti-aliasing, or denoise may be employed.

In some embodiments, temporal and other information from decode (i.e., information embedded in the video bitstream) of the input video is used to guide the super-resolution or other enhancement processing, inclusive of application of a deep network (video super-resolution network), to the input video. In some embodiments, for small quantization parameter (QP) video frames, when a current block being processed is coded as inter mode with no residue in the bitstream, instead of applying the deep learning super-resolution or other enhancement network, a corresponding region in a previous high-resolution or enhanced output frame is used as a reference for the block to generate the final super-resolution or enhanced output. In some embodiments, when a frame has a high QP, the frame (i.e., all blocks of the frame) are upsampled using interpolation techniques or otherwise enhanced such that the deep learning network is bypassed. In some embodiments, the interpolation or other enhancement may be advantageously implemented in hardware. In some embodiments, when the frame has low QP, blocks other than those having an inter mode with no residue are upsampled or otherwise enhanced using the deep learning network. As discussed, for those blocks having an inter mode with no residue (e.g., skip blocks), the deep learning network is bypassed and previously generated super-resolution pixel samples or otherwise enhanced pixel samples are retrieved and used for the block. In such frames, those super-resolution blocks or enhanced blocks generated using the deep learning network and those generated by retrieving from a prior generated super-resolution or enhanced frame are then merged into a resultant super-resolution or enhanced frame.

The techniques discussed herein use metadata determined in the video decode of input video (e.g., via a video codec) to reduce the computation complexity of deep learning network or artificial intelligence based workload with little or no quality impacts. Such techniques connect video compression and machine learning/deep learning based video processing for systematic performance optimization. Although largely illustrated and discussed herein with respect to super-resolution video processing, the discussed techniques may be applied to any suitable deep learning network based video processing environment such as deep learning based anti-aliasing networks, deep learning-based noise reduction networks, etc. For example, the discussed techniques may be applied in a large range of AI-based workloads to solve computation/memory bandwidth bottlenecks, which is advantageous in the network deployment particularly on constrained computing platforms (e.g., low-end/mid-end GPU platforms).

FIG. 1 is an illustrative diagram of an example system 100 for processing via selective application of a deep learning network, arranged in accordance with at least some implementations of the present disclosure. As shown in FIG. 1, system 100 includes a video decoder 101, a QP comparison module 102 (labeled QP<TH?), residual values comparison module 103 (labeled Residuals=0?), a hardware upsampler 104, a pixel value transfer module 105, a deep learning super-resolution network 106 (labeled AI Based Super Resolution), and a frame merge module 107. For example, system 100 receives an input video bitstream 111 (representative of video at a lower resolution) for super-resolution processing and system 100 provides upsampling to output video 118 at a higher resolution. Although illustrated with respect to super-resolution processing, system 100 may be employed in any suitable video deep learning applications such as anti-aliasing, noise reduction, or the like as discussed further herein below with respect to FIG. 6.

System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform. System 100 may include other modules or components not shown for the sake of clarity of presentation. The techniques presented with respect to system 100 use existing metadata (i.e., QP, block motion vectors, and residual information) embedded in input video bitstream 111 to adaptively select different upscaling (i.e., super-resolution) approaches to reduce computation complexity with little or no noticeable quality loss with respect to application of deep learning super-resolution network to all blocks of all frames of decoded video.

Input video bitstream 111 may be any suitable bitstream such as a standards compliant bitstream. For example, bitstream 115 may be any of Advanced Video Coding (AVC), High Efficiency Video Coding (HEVC), Versatile Video Coding (VVC), VP9, or AV1 compliant. Video decoder 101 receives input video bitstream 111 and decodes input video bitstream 111 (by implementing the corresponding codec) to generate decoded video as video frames 113. Video frames 113 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, or the like, and the video may include any number of video frames, sequences of video frames, pictures, groups of pictures, or the like. Techniques discussed herein are discussed with respect to video frames and blocks thereof for the sake of clarity of presentation. However, such video frames may be characterized as pictures, etc. and the blocks may be characterized as coding units, largest coding units, macroblocks, coding blocks, etc. For example, a picture or frame of color video data may include a luminance plane or component and two chrominance planes or components at the same or different resolutions with respect to the luminance plane. Video frames 113 (during encode) may be divided into blocks of any size, which contain data corresponding to blocks of pixels. Such blocks may include data from one or more planes or color channels of pixel data.

Furthermore, video decoder 101, provides metadata including quantization parameters 112 (QPs) and motion vectors and coding modes 114. Coding modes 114 may include frame level coding information (e.g., frame type including I-frame, P-frame, etc.) and block level coding information including the coding mode of a block and, if applicable, a motion vector and residual information of a block for use as discussed herein. For example, the metadata may include all such information or only information pertinent to selective deep learning network application as discussed herein. For example, in contrast to a typical video decoder that only outputs video frames 113, video decoder 101 generates the metadata via a request of targeted information, via a request of a metadata dump of all such information, or the like.

Video frames 113, or blocks thereof, are provided selectively to hardware upsampler 104, pixel value transfer module 105, an deep learning super-resolution network 106 for selective processing as discussed herein. For example, pixel samples of video frames 113 (at a lower resolution) may be stored to memory and accessed for processing.

QP comparison module 102 receives QPs 112, which may be frame, slice, or block level quantization parameters. In some embodiments, QPs 112 are frame level quantization parameters such that the selection made via QP comparison module 102 applies at the frame level. QP comparison module 102 receives QPs 112 and compares each quantization parameter to a threshold (TH). The threshold may be any suitable value to indicate high compression (e.g., low QP) versus low compression (e.g., high QP). For example, in some coding contexts, the available quantization parameter may range from 1 (or 0) to 51 and the threshold may be in the range of about 26 to 34. In some embodiments, the threshold is established as a percentage of the quantization parameter range of the pertinent codec used to decode input video bitstream 111. In some embodiments, the threshold is in the range of 50% to 70% from the lowest available QP value to the highest QP value (e.g., $TH=0.65*(QP_{high}-QP_{low})$ for the example of 65%). In some embodiments, the threshold is in the range of 55% to 65% from the lowest available QP value to the highest QP value. In some embodiments, the threshold is in the range of 55% to 60% from the lowest available QP value to the highest QP value. Notably, when the quantization parameter is greater than the threshold, the corresponding video frame was highly compressed and many textural details have been lost. In such contexts, implementation of deep learning super-resolution network 106 does not have the quality improvement with respect to hardware upsampler 104 to justify the increased computation costs.

As shown, when the quantization parameter exceeds the threshold at QP comparison module 102, processing continues at hardware upsampler 104. As discussed, hardware upsampler 104 implements interpolation based upsampling to generate super-resolution blocks 115 at a resolution greater than that of video frames 113 and equivalent to that of resultant output video 118. Output video 118 may be at any suitable resolution greater than that of video frames 113 such as at VGA resolution, HD resolution, Full-HD resolution, 4K resolution, 8K resolution, etc. The upsampling may be by any suitable factor such as 2× in both the horizontal and vertical directions or 4× in both the horizontal and vertical directions.

Although discussed with respect to implementation via hardware, the discussed interpolation may be performed via software, however, it is common to provide interpolation based upsampling in hardware in many systems and platforms. Such interpolation based upsampling may include any suitable technique or techniques such as bilinear interpolation, bicubic interpolation, Lanczos interpolation, or others. It is noted that such techniques may be differentiated with respect to upsampling provided by deep learning super-resolution network 106 in that no deep learning layers, convolutional layers, connected layers, etc. are applied. Although, super-resolution blocks 115 are illustrated as being output from hardware upsampler 104 to frame merge module 107, in some embodiments, hardware upsampler 104 outputs full super-resolution frames that need not be merged with other blocks. Notably, hardware upsampler 104 may be applied on a frame-wise basis based on frame level QP with the interpolation based upsampling being performed regardless of coding mode of the blocks of the frame.

When the quantization parameter does not exceed the threshold at QP comparison module 102, processing continues at residual values comparison module 103. Residual values comparison module 103 receives coding modes 114. As discussed, coding modes 114 includes at least block based motion vectors with residual information. Coding modes 114 may also include other coding mode information such as indicators of whether blocks are inter or intra blocks, modes for intra blocks, etc. but such information is not strictly necessary to the processing discussed herein. The term residual information indicates whether any residuals had been coded (e.g., included in input video bitstream 111) for the block, a number of coded residuals, skip flag or similar information indicate of whether or not residuals were coded for the block. The term residual indicates a value for the block determined based on differencing a block with a reference block, transform, and quantization. Notably, some blocks are coded with a motion vector (which may be a zero MV) and no residual information such that during decode by video decoder 101, the block is reconstructed only by accessing pixel samples of a previously reconstructed frame (and without addition of residuals to the pixel samples). In some codecs, such blocks are characterized as skip blocks, skip mode blocks, or the like.

As shown, when a block has an inter video coding mode (e.g., is an inter block) and the residual information is zero (e.g., no residuals are coded for the block), processing continues at pixel value transfer module 105 where deep learning super-resolution network 106 is again bypassed and a corresponding super-resolution block 116 is generated by retrieving previously generated pixel samples using the motion vector for the block. Such pixel sample retrieval techniques are discussed further herein. Briefly, the motion vector for the block (as indicated by coding modes 114) is used to access pixel samples of a previously generated super-resolution frame of output video 118 and the pixel samples are provided as super-resolution block 116 to frame merge module 107. Notably, super-resolution block 116 is at the desired resolution of output video 118. Furthermore, since both video decoder 101 and deep learning super-resolution network 106 are block-based (e.g., process in a block-wise manner), processing selection may be made on a block-wise basis. Such processing bypasses deep learning super-resolution network 106, advantageously at the block level, and instead uses a computationally lightweight pixel transfer process to generate super-resolution block 116. Such techniques have been found to provide sufficient image quality with little or no quality loss while advantageously reducing processing time.

Returning to residual values comparison module 103, when a block had residual corresponding residual values (e.g., in input video bitstream 111) or when the block was intra coded (which typically also includes residual values), processing continues at deep learning super-resolution network 106, where a deep learning super-resolution network is applied to the block to generate a super-resolution block 117 at the resolution of output video 118. In some embodiments, when a block is not skip mode, processing continues at deep learning super-resolution network 106. In some embodiments, when a block is intra processing continues at deep learning super-resolution network 106. In some embodiments, when a MV is provided and one or more residual values are provided for a block, processing continues at deep learning super-resolution network 106.

Deep learning super-resolution network 106 may apply any suitable artificial intelligence-based or deep learning based super-resolution processing. In some embodiments, deep learning super-resolution network 106 applies one or more convolutional layers. Notably, deep learning super-resolution network 106 applies deep learning layers, convolutional layers, connected layers, or similar deep learning architecture components. Furthermore, deep learning super-resolution network 106 is applied only to those blocks that have low QP and residual values. Such techniques limit application of deep learning super-resolution network 106 to those blocks that are benefited most to advantageously apply the costly computation of deep learning super-resolution network 106 thereto.

As shown, frame merge module 107 receives super-resolution blocks 116, super-resolution blocks 117, and, if applicable, to super-resolution blocks 115 to generate a frame of output video 118 by merging the super-resolution blocks into a full super-resolution frame of output video 118. In some embodiments, frame merge module 107 also applies filtering such as de-block filtering or other image enhancement techniques. As discussed, output video 118 may be employed in a variety of contexts such as display to a user or use by other applications. Output video 118 may be sent to a display of system 100, to a memory of system 100, to another device via a communications link, etc.

The techniques discussed herein provide a variety of advantages including low overhead (as all information used to control super-resolution processing is required by the video decoder), acceleration of super-resolution processing using characteristics of the video content (with acceleration depending on content type: with no skip blocks, performance is about the same as application of a network with selectivity, with gaming and screen content performance increase of 45%-90% may be achieved), no conflict with other performance enhancements made via the network, and support for a wide range of codecs (inclusive of AVC, HEVC, VVC, and others).

Furthermore, the discussed techniques may be used in conjunction with region of interest (ROI) video processing techniques. Notably, ROI-based processing may be used in either video compression or video processing to save bitrate and/or to reduce computation resource usage. In some embodiments, a video frame is divided into more important region of interest areas and less important non-interest areas and more bits are utilized and/or special processing is performed in region of interest areas. In the discussed techniques, a joint system level performance optimization between video decoder and AI-based (e.g., deep learning based) video processing workload is provided. Notably, all regions are equally important in the discussed techniques and the same processing selection is applied to both ROI areas and non-ROI areas. As a result, the discussed techniques may be used together with ROI-based techniques such as ROI-based codecs. For example, all blocks of a video frame may be processed using the techniques discussed with respect to FIG. 1 and elsewhere herein such that region of interest blocks and non-region of interest blocks are processed in the same manner.

Figure 2:
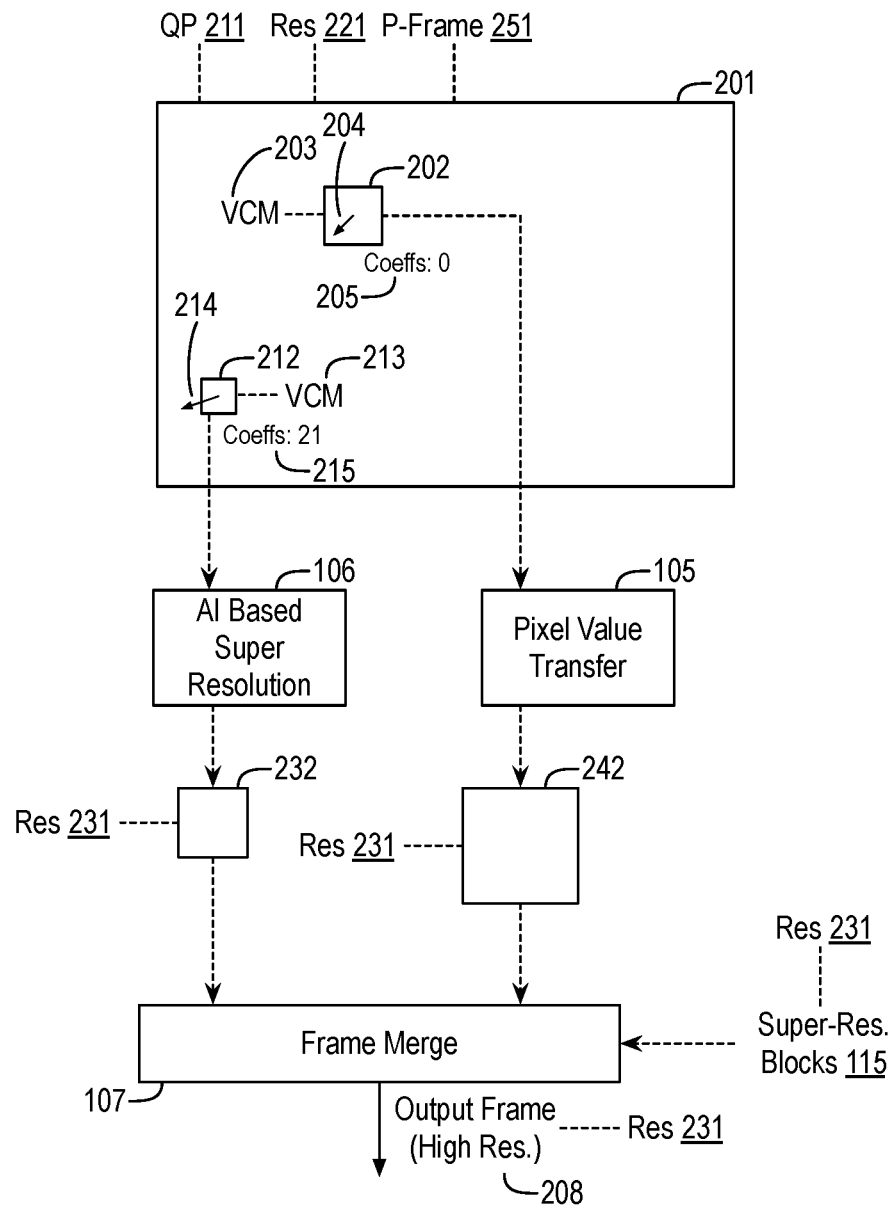
FIG. 2 illustrates example block-wise selective application of a deep learning network for a low quantization parameter frame.

FIG. 2 illustrates example block-wise selective application of a deep learning network for a low quantization parameter frame, arranged in accordance with at least some implementations of the present disclosure. In the example of FIG. 2, video frames 113 include a video frame 201 at a lower resolution 221 having a frame level quantization parameter 211. Frame 201 is indicated as a P-frame 251 but may have any suitable frame type. As discussed, frame level quantization parameter 211 is less than threshold, TH, as determined by QP comparison module 102. Furthermore, video frame 201 is divided into any number of blocks as indicated by the partitioning provided by input video bitstream 111. That is, partitioning information as provided by input video bitstream 111 corresponds to video frame 201. The blocks of video frame 201 include a block 202 having a particular video coding mode 203 and a block 212 having a different video coding mode 213. Notably, video coding mode 203 indicates block 202 has a motion vector 204 and zero residual coefficients 205 such that block 202 is a skip block. In some embodiments, video coding mode 203 indicates a skip flag and a motion vector (which may be a zero motion vector). Similarly, video coding mode 213 indicates block 212 has motion vector 214 and residual coefficients 215 (in this example 21 residual coefficients). As used herein, a video coding may include information needed to decode a block such as intra or inter mode, a motion vector, a skip flag or no skip flag, an intra mode (of available intra modes based on the codec), and so on.

Responsive to video coding mode 203, pixel value transfer module 105 is implemented for block 202. For example, in response to video coding mode 203 indicating a skip mode, pixel value transfer module 105 is implemented and deep learning super-resolution network 106 is bypassed for block 202. As shown, pixel value transfer module 105 retrieves pixel samples to generate a corresponding super-resolution block 242 (or output block) for block 202 such that super-resolution block 242 is at a resolution 231 greater than resolution 221 and equivalent to that of output frame 208. Super-resolution block 242 may be generated using any suitable technique or techniques such as those discussed with respect to FIG. 3 herein.

Furthermore, responsive to video coding mode 213, deep learning super-resolution network 106 is applied to block 212 to generate a super-resolution block 232 (or output block) for block 212 such that super-resolution block 232 is also at resolution 231. For example, in response to video coding mode 213 indicating a non-skip mode (of any type: intra mode, inter mode with residuals, etc.), deep learning super-resolution network 106 is implemented and pixel value transfer is not employed. As discussed, deep learning super-resolution network 106 may implement any suitable deep learning network to improve the upsampling quality of block 212 at the cost of increased computation and memory usage. Also as shown with respect to FIG. 2, blocks 202, 212 may have any suitable sizes. Although illustrated with respect to block 202 being larger than block 212, they may have the same size or block 212 may be larger 213. Furthermore, although illustrated with respect to square blocks, blocks 202, 212 may have any suitable shape such as rectangular.

As discussed with respect to FIG. 1, super-resolution blocks 232, 242 and other super-resolution blocks as generated by pixel value transfer module 105, deep learning super-resolution network 106, and, optionally, hardware upsampler 104 are received by frame merge, which merges the super-resolution blocks into a super-resolution output frame 208 at resolution 231. For example, super-resolution output frame 208 may be a frame of output video 118. It is noted that video frame 201 and super-resolution output frame 208 are correlated temporally such that both frames have the same time instance in a video stream. As discussed further herein below, pixel value transfer module 105 may access previously upsampled frames to generate super-resolution block 242.

Figure 3:
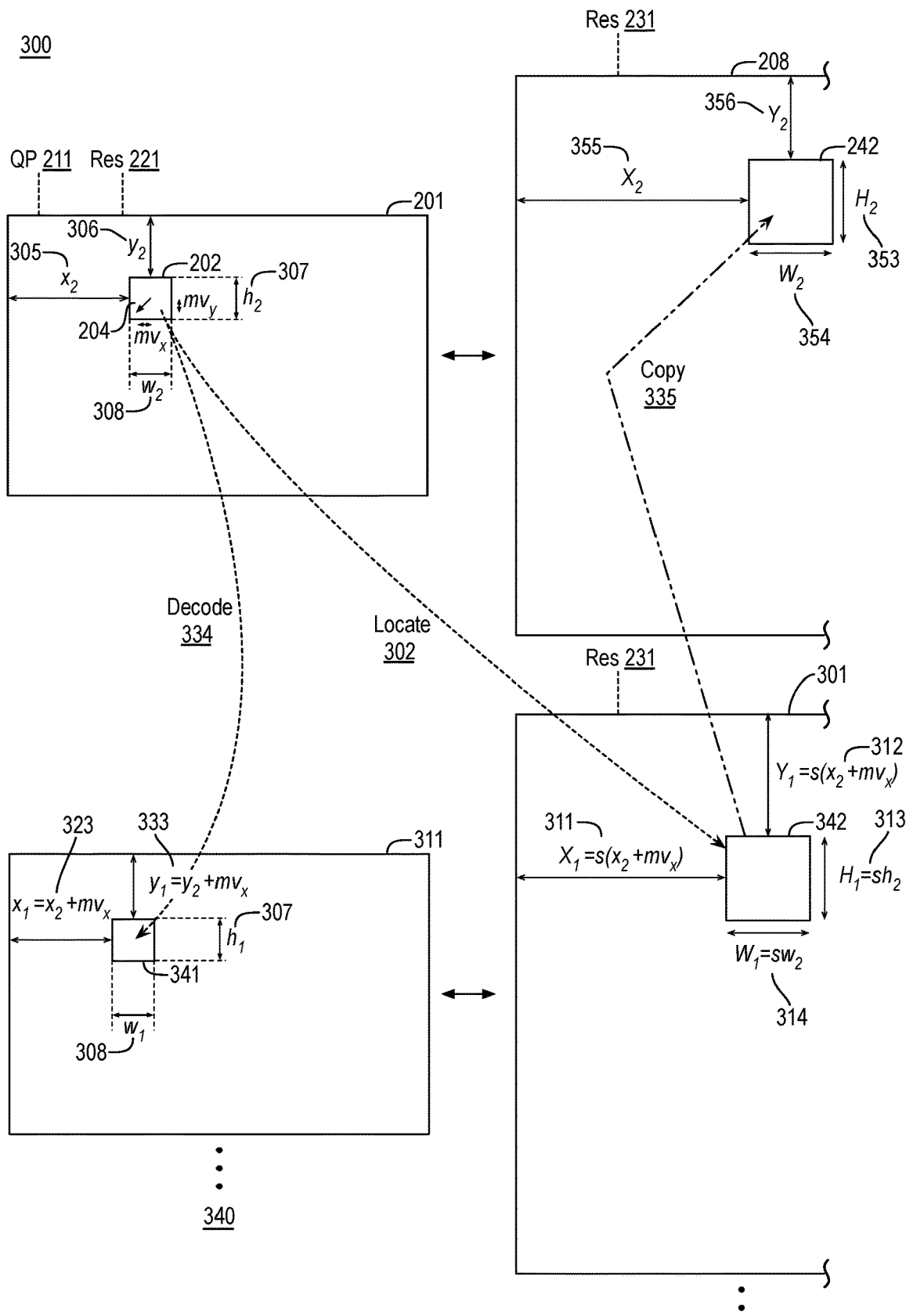
FIG. 3 illustrates example pixel value transfer processing in super-resolution contexts.

FIG. 3 illustrates example pixel value transfer processing 300 in super-resolution contexts, arranged in accordance with at least some implementations of the present disclosure. For example, pixel value transfer processing 300 may be performed by pixel value transfer module 105 as discussed herein. Notably, pixel value transfer processing 300 provides a low complexity pixel value transfer technique to generate a super-resolution (high-resolution) block for a current frame based on retrieval of pixel samples from a prior processed frame.

As shown, video frame 201, at lower resolution 221, is in a video sequence 340 of lower resolution 221 frame including video frame 201, video frame 311, and so on. For example, video sequence 340 may be a video sequence of video frames 113. As discussed, based on video frames 113, corresponding higher resolution 231 output video 118 is generated including super-resolution frame 208 (temporally corresponding to video frame 201), a super-resolution frame 301 (temporally corresponding to video frame 311), and so on such that each of video frames 113 has a corresponding super-resolution video frame at the same time instance, time stamp, temporal location in a super-resolution sequence 350. In FIG. 3, only left-side portions of super-resolutions frame 208, 301 are shown for the sake of clarity. It is noted that a first video frame of video frames 113 is coded as an intra frame (as discussed with respect to FIG. 4) and, as the intra frame has a QP less than TH and no skip blocks, all blocks (and all pixel samples) of the intra frame are processed by deep learning super-resolution network 106 to generate a corresponding super-resolution frame.

As discussed, block 202 has a corresponding motion vector 204, having x- and y-components ($mv_x$, $mv_y$). Furthermore, block 202 has a width 308, $w_2$, and a height 307, $h_2$, and is located at a horizontal position 305, $x_2$, and a vertical position 306, $y_2$, within video frame 201. Notably, blocks (or other rectangular partitions) of pixel samples within video frame 201 may be represented by a 4-tuple (x, y, w, h) where (x, y) provide the horizontal and vertical components of the upper-left corner of the block, respectively, and (w, h) provide the block width and height, respectively.

Accordingly, the pixel samples of block 202 are provided by the 4-tuple ($x_2$, $y_2$, $w_2$, $h_2$). As discussed, block 202 is skip mode with motion vector 204 but no residual coding (e.g., such that residual information equals 0 before a deblocking filter is applied in the decoding process). In the decode, block 202 is directly copied from block 341 of video frame 311 (which may be temporally prior to or subsequent to video frame 201 in a display order but must be temporally prior to video frame 201 in a coding order) as shown via decode operation 334 based on Equations (1):

$$x_1 = x_2 + mv_x$$

$$y_1 = y_2 + mv_y$$

$$w_1 = w_2$$

$$h_1 = h_2 \qquad (1)$$

where block 341 in video frame 311 has a width 308, $w_2$, and a height, $h_2$, 307 and is located at a horizontal position 323, $x_1$, and a vertical position 333, $y_1$, within video frame 201. It is noted that Equations (1) may also be used to locate a block for pixel transfer in an enhanced frame when super-resolution processing is not performed as discussed herein.

Turning to generation of super-resolution block 242 of super-resolution frame 208, pixel value transfer module 105 locates, via location operation 302, a prior super-resolution block 342 within prior super-resolution frame 301. In this context, prior indicates super-resolution block 342 and super-resolution frame 301 are generated prior to generation of super-resolution block 242, but not necessarily that super-resolution frame 301 is prior to super-resolution frame 208 in a display order.

As shown, to provide the pixel samples of super-resolution block 242 within super-resolution video frame 208, pixel samples of super-resolution block 342 are copied, via copy operation 335, and merged into super-resolution video frame 208. The pixel samples of super-resolution block 242 are characterized by the 4-tuple $(X_2, Y_2, W_2, H_2)$ such that super-resolution block 242 has a width 354, $W_2$, and a height 353, $H_2$, and is located at a horizontal position 355, $X_2$, and a vertical position 356, $Y_2$, within super-resolution video frame 208. For example, the 4-tuple $(X_2, Y_2, W_2, H_2)$ for super-resolution block 342 may be a scaled version of the 4-tuple of block 202 are provided by the 4-tuple $(x_2, y_2, w_2, h_2)$ such that $(X_2, Y_2, W_2, H_2)=(sx_2, sy_2, sw_2, sh_2)$.

Notably, pixel value transfer module 105 locates super-resolution block 342 at a size and position within super-resolution frame 301 based on the size and position of block 202, motion vector 204, and a scaling factor, s, which may match the scaling of the upsampling of video frame 201 to super-resolution frame 208. For example, for scaling of 2× in both the horizontal and vertical directions, s=2, for scaling of 4× in both the horizontal and vertical directions, s=4, and son on. In the illustrated example, upsampling is the same in both the horizontal directions $(s=s_h=s_v)$. In some embodiments, such upsampling factors may differ $(s_h \neq s_v)$. In some embodiments, no upsampling is provided in one of the horizontal or vertical directions $(s_h=1$ or $s=1_v)$. In such contexts, a vertical scaler, $s_v$, is applied in the vertical direction and a horizontal scaler, $s_h$, is applied in the vertical direction.

As discussed, the pixel samples of super-resolution block 342 are copied, via copy operation 335, and merged into super-resolution video frame 208 as super-resolution block 242. The pixel samples of super-resolution block 342 in super-resolution video frame 301 are provided by the 4-tuple $(X_1, Y_1, W_1, H_1)$ such that super-resolution block 342 has a width 314, $W_1$, and a height 313, $H_1$, and is located at a horizontal position 311, $X_1$, and a vertical position 312, $Y_1$, within super-resolution video frame 301 where the 4-tuple values $(X_1, Y_1, W_1, H_1)$ are provided using Equations (2):

$$X_1 = s(x_2 + mv_x)$$

$$Y_1 = s(y_2 + mv_y)$$

$$W_1 = sw_2$$

$$H_1 = sh_2 \qquad (2)$$

where horizontal position 311, $X_1$, is the horizontal location, $x_2$, of block 202 adjusted by the horizontal component of motion vector 204, $mv_x$, and scaled by the scaling factor, s, vertical position 312, $Y_1$, is the vertical location, $y_2$, of block 202 adjusted by the vertical component of motion vector 204, $mv_y$, and scaled by the scaling factor, s, width 314, $W_1$, is the width of block 202, $w_2$, scaled by the scaling factor, s, and height 313, $H_1$, is the height of block 202, $h_2$, scaled by the scaling factor, s. It is noted that if horizontal position 311, $X_1$, or vertical position 312, $Y_1$, are determined to be fractional coordinates, image interpolation is applied to generate the pixel sample values using any suitable technique or techniques. In some embodiments, bilinear interpolation is employed.

Figure 4:
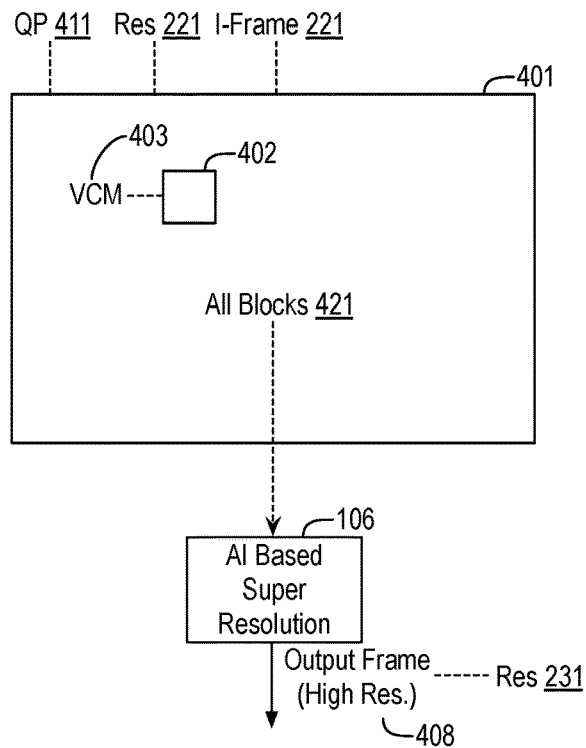
FIG. 4 illustrates example frame-wise selective application of a deep learning network for an I-frame.

FIG. 4 illustrates example frame-wise selective application of a deep learning network for an I-frame 401, arranged in accordance with at least some implementations of the present disclosure. As shown in FIG. 4, video frames 113 may include any number of I-frame (intra frames) including I-frame 401 at resolution 221. Notably, I-frame 401 was compressed without reference to any other frame of video frames 113 and, therefore, includes no blocks having a motion vector and zero residual coefficients (or no residual information). Since I-frames 401 are typically coded with low quantization parameters (to provide a high quality frame both for presentation to a user and for reference in coding subsequent frames), all blocks 421 of I-frame 401 including a block 402 are upsampled via deep learning super-resolution network 106 to generate a super-resolution output frame 408 at resolution 231.

As shown, block 402 includes a video coding mode 403, which may be any suitable intra coding mode such as an angular mode, a planar mode, or a DC mode. However, regardless of video coding mode 403, block 402 and all blocks 421 of I-frame 401 are upsampled (i.e., super-resolution processed) using deep learning super-resolution network 106. Such processing provides a high quality upsampling for I-frame 401. In some embodiments, super-resolution output frame 408, corresponding to I-frame 401, is a reference frame such as super-resolution frame 301 for the retrieval of super-resolution pixel samples by pixel value transfer module 105. By providing high quality upsampling for all blocks 421 of I-frame 401, high quality reference pixels are provided for improved performance in some contexts.

Figure 5:
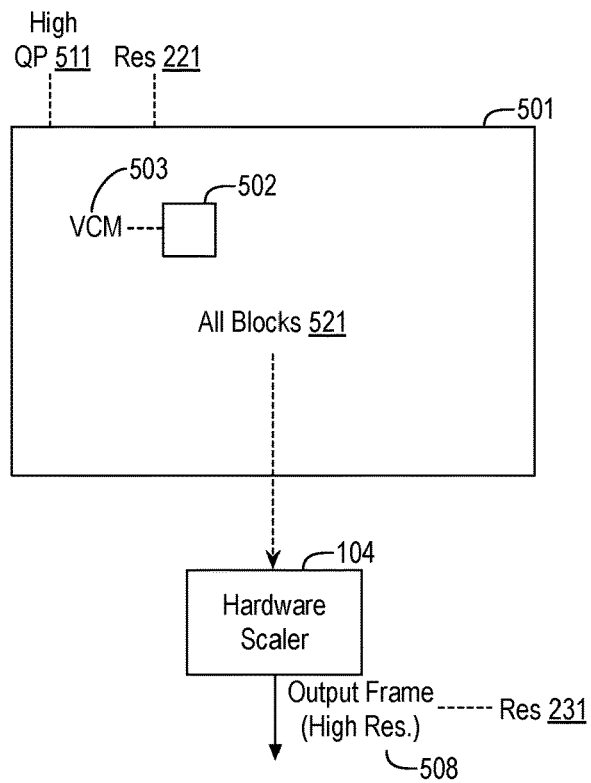
FIG. 5 illustrates example frame-wise selective application of a deep learning network for a low quantization parameter frame.

FIG. 5 illustrates example frame-wise selective application of a deep learning network for a low quantization parameter frame 501, arranged in accordance with at least some implementations of the present disclosure. As shown in FIG. 5, video frames 113 may include any number of high QP 511 frames such as frame 501 at resolution 221 such that high QP 411 is greater than the threshold, TH, applied with respect to QP comparison module 102. Notably, frame 501 was compressed with high QP 511 such that detail and texture is likely to be lost in the reconstruction of frame 501. As discussed, since high QP 511 frame 501 has a QP that exceeds threshold, TH, all blocks 521 of frame 501 including a block 502 are upsampled via interpolation techniques as applied by, for example, hardware upsampler 104 to generate a super-resolution output frame 508 at resolution 231.

Block 502 includes a video coding mode 503, which may be any suitable coding mode such as an intra mode, an inter mode with or with coded residuals, etc. However, regardless of video coding mode 503, block 502 and all blocks 521 of frame 501 are upsampled (i.e., interpolated) using hardware upsampler 104. Such processing provides fast and hardware implemented upsampling for frame 501. Notably, output frame 508 is unlikely to be a reference frame for the retrieval of super-resolution pixel samples by pixel value transfer module 105 such that lower quality upsampling is less impactful. Furthermore, the difference between the quality of upsample as provided by deep learning super-resolution network 106 over interpolation techniques is likely to be small (and in some cases interpolation can outperform deep learning super-resolution network 106) due to the lack of detail and texture. Therefore, the high computational cost of applying deep learning super-resolution network 106 to frame 501 at very low cost in loss quality.

Figure 6:
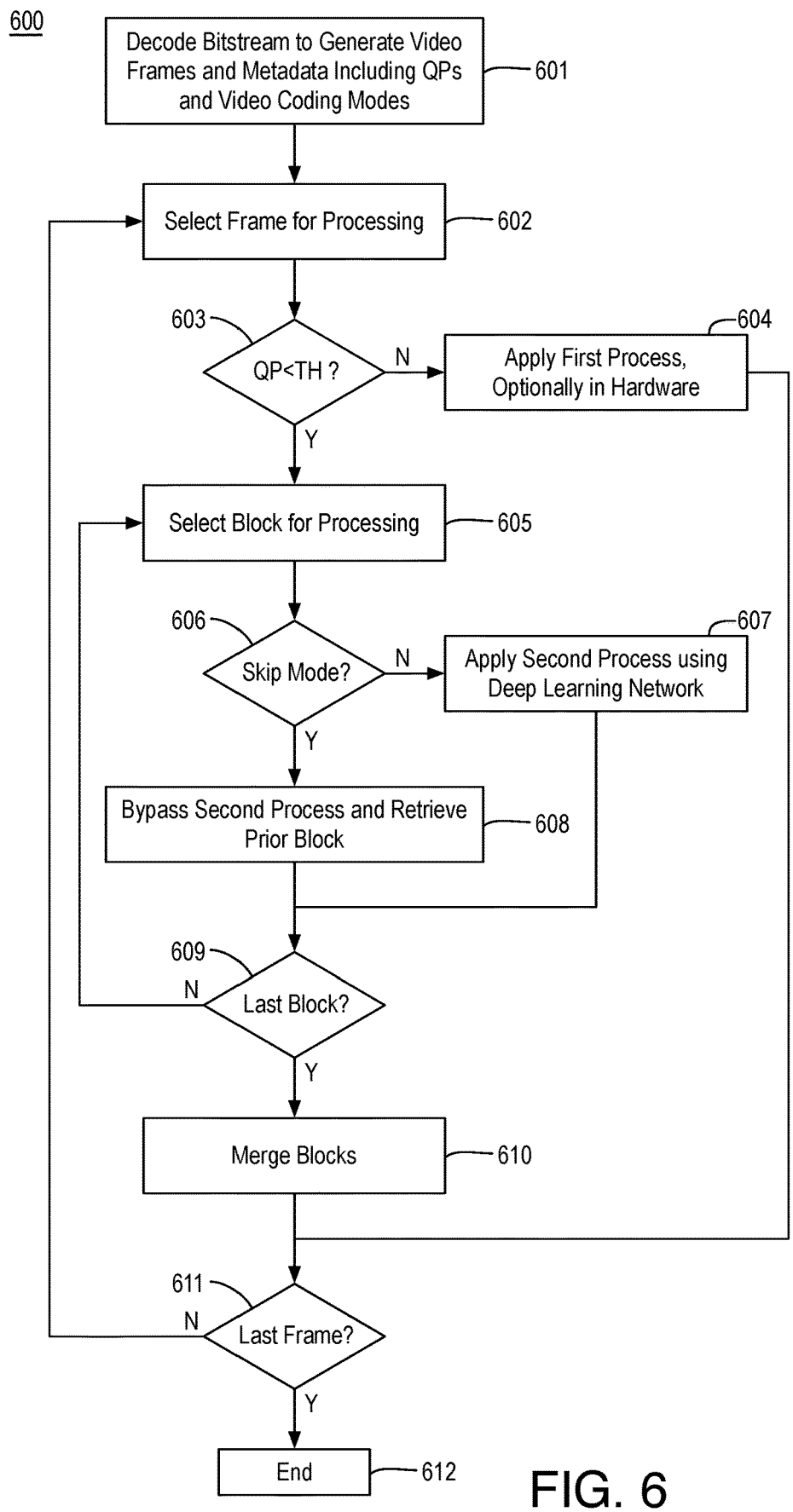
FIG. 6 is a flow diagram illustrating an example process 600 for providing adaptive video enhancement processing based on frame level quantization parameter and block level video coding modes.

FIG. 6 is a flow diagram illustrating an example process 600 for providing adaptive video enhancement processing based on frame level quantization parameter and block level video coding modes, arranged in accordance with at least some implementations of the present disclosure. Process 600 may include one or more operations 601-612 as illustrated in FIG. 6. Process 600 may be performed by any device or system discussed herein to process decoded video.

Processing begins at operation 601, where a bitstream is decoded to generate a video sequence including any number of video frames. Furthermore, the decode generates metadata including quantization parameters (frame level, slice level, and/or block level) and video coding modes for blocks of the video frames. Notably, a video coding mode for a block may include any or all information needed to decode the block. For example, the video coding mode for a block may include whether the block is a skip block (i.e., an inter block with a motion vector and no residuals), a non-skip inter block (i.e., an inter block with a motion vector and residuals), an intra block, and so on, or information that may be used to determine the video coding mode. As used herein, terms such as a block comprising, including, or having, a coding mode or video coding mode, or similar terms, indicate the video coding mode corresponds to the block and was used to encode (remotely) the block and decode (locally, at a video decoder) the block.

Notably, the video frames to be decoded are to be enhanced in some manner such as super-resolution processing (e.g., upsampling), anti-aliasing (e.g., to smooth edges), noise reduction (e.g., to remove undesirable noise), or other image processing. The techniques discussed with respect to process 600 adaptively apply such processing by applying a deep learning network to decoded video frame samples, by retrieving prior processed samples, or by applying a non-deep learning network based approach (optionally in hardware) to the decoded video frame samples. In any such case, the output block for a processed block is provided for merge into output frame. Such anti-aliasing, noise reduction, or other video frame enhancement processing is performed in analogy with the techniques discussed herein above with respect to super-resolution processing.

Processing continues at operation 602, where a video frame of the video sequence decoded at operation 601 is selected for processing. The video frames may be selected in any order such as display order of the video sequence.

Processing continues at decision operation 603, where a determination is made as to whether a frame level QP for the selected frame is less than a threshold. The threshold may be any suitable value and may depend on the codec employed at operation 601. The threshold may be a percentage of the quantization parameter range of the pertinent codec used to decode bitstream 111 such as 50% to 70% from the lowest available QP value to the highest QP value, 55% to 65% from the lowest available QP value to the highest QP value, or 55% to 60% from the lowest available QP value to the highest QP value. Furthermore, the threshold may vary depending on the enhancement processing being performed in process 600.

If the QP meets or exceeds the threshold, processing continues at operation 604, where a first video enhancement is applied, optionally in hardware, to the current frame (i.e., all blocks of the current frame). The first video enhancement is non-deep learning network based and computationally less demanding than the processing discussed below with respect to operation 607. In some embodiments, the first video enhancement processing is performed in hardware. For example, the first video enhancement processing may be legacy processing that is accelerated in hardware in a monolithic integrated circuit. In some embodiments, the first video enhancement processing does not employ any deep learning layers, convolutional layers, connected layers, etc. The first video enhancement processing may be linear or non-linear but is characterized in that it applies no pretrained parameters trained using deep learning. The resultant output frame (i.e., a super-resolution frame, anti-aliased frame, denoised frame, etc.) is output and processing continues at decision operation 610 as discussed below. For example, the resultant output frame may be output for presentment to a user, to memory for future use, or to another device.

If the QP is less than the threshold at decision operation 603, processing continues at operation 605, where a block of the current video frame is selected for processing. The blocks of the current frame may be processed in any order such as a raster scan order. Although process 600 illustrates frame level QP and block level video coding mode processing, in other embodiments, the discussed QP based decision may be base on slice level QP, largest coding unit QP, or block level QP.

Processing continues at decision operation 606, where a determination is made as to whether the selected block is a skip block (i.e., includes or has corresponding thereto a skip mode). As discussed, a skip block is characterized in that it is encoded and decoded as an inter block with a motion vector (which may be a zero motion vector) and no residuals. It is noted that not all blocks selected at operation 605 and processed as discussed herein are the same size. Instead, such block sizes may correspond coding blocks such that each coding block is partitioned to a particular size based on an optimal partitioning of a larger block (e.g., a largest coding unit) as determined during encode.

If the current block does not have a skip mode (i.e., has an intra mode or inter mode with residuals), processing continues at operation 607, where second video enhancement processing is applied such that the second video enhancement processing employs a deep learning network. As discussed, a deep learning network is characterized in that it implements machine learning using an artificial neural network having several layers between an input layer and an output layer of the network such that the layers may include convolutional layers, fully connected layers, or the like. In some embodiments, the deep learning network employs pre-trained network parameters such as convolutional filter weights, activation values, etc. The deep learning network may be characterized by the task it performs inclusive of deep learning super-resolution network, deep learning anti-aliasing network, deep learning denoising network, etc. The deep learning network may have any suitable architecture or topology. Furthermore, the computational resources needed to process a block of the same size at operation 607 are greater than (e.g., in terms of processor time required for the same processor, number of elementary operations, amount of memory used, etc.). The processing performed at operation 607 requires more computational resources and is expected to provide higher quality (both in objective and subjective terms) relative to the processing performed at operation 604.

Returning to decision operation 606, if the current block has a skip mode, processing continues at operation 608, where the second video enhancement processing is bypassed (as is the first) and, for the current block, a prior processed block is retrieved and copied. In some embodiments, the prior block was processed using the second video enhancement processing. In some embodiments, the prior block is part of a prior processed frame (e.g., a super-resolution frame, anti-aliased frame, denoised frame, etc.) and the pixel samples of the prior block are located and copied based the motion vector corresponding to the current block. Such locating and copying for super-resolution blocks is discussed herein with respect to Equations (2). For blocks and prior blocks of the same size, such locating and copying is performed as discussed with respect to Equations (1).

As discussed herein, in video frames that apply region of interest coding, region of interest blocks and non-region of interest of blocks of the video frame are processed in the same manner. Notably, the techniques discussed with respect to process 600 apply to both region of interest blocks and non-region of interest of blocks equally and depend on the video coding mode of the block such that skip mode region of interest blocks and skip mode non-region of interest of blocks are processed in the same manner (e.g., prior block retrieval is performed) and, likewise, non-skip mode region of interest blocks and non-skip mode non-region of interest of blocks are processed in the same manner (e.g., deep learning network processing is performed).

Processing continues from operation 607 or operation 608 for the current block at decision operation 609, where a determination is made as to whether the last block of the current frame is being processed. If not, processing continues at operations 605-609 as discussed above until all blocks have been processed.

If so, processing continues at operation 610, where the blocks generated by application of the second video enhancement processing using a deep learning network and blocks that bypass application of the second video enhancement processing and instead are retrieved from prior enhanced video frames are merged into a current enhanced video frame. Such merger may further include deblock filtering or other processing. The resultant video frame is output as discussed with respect to operation 604.

Processing continues at decision operation 611, where a determination is made as to whether the last frame of the video sequence is being processed. If not, processing continues at operations 602-610 as discussed above until all frames have been processed. If so, processing ends at end operation 612.

Figure 7:
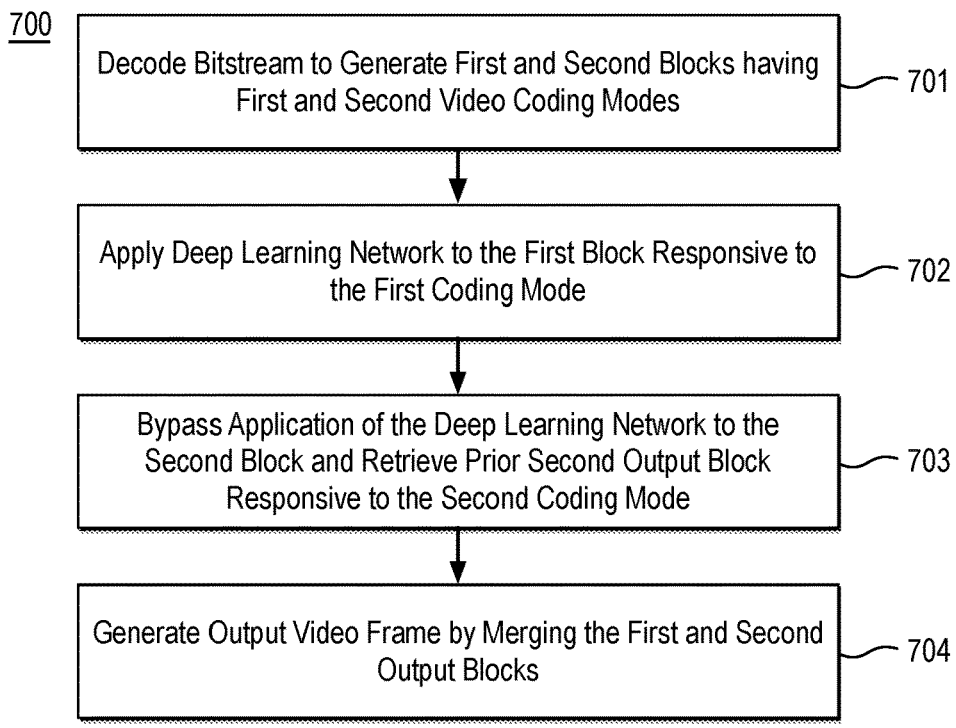
FIG. 7 is a flow diagram illustrating an example process for providing adaptive enhancement video processing.

FIG. 7 is a flow diagram illustrating an example process 700 for providing adaptive enhancement video processing, arranged in accordance with at least some implementations of the present disclosure. Process 700 may include one or more operations 701-704 as illustrated in FIG. 7. Process 700 may form at least part of a video enhancement process. By way of non-limiting example, process 700 may form at least part of a video process as performed by any device or system as discussed herein such as system 100. Furthermore, process 700 will be described herein with reference to system 800 of FIG. 8.

Figure 8:
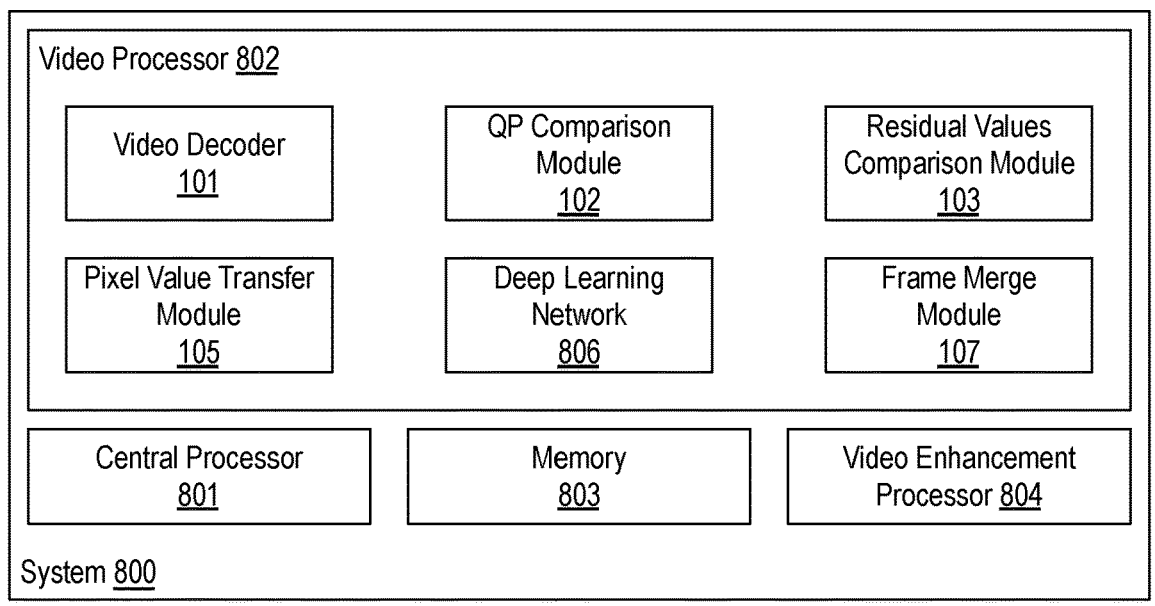
FIG. 8 is an illustrative diagram of an example system for providing adaptive enhancement video processing.

FIG. 8 is an illustrative diagram of an example system 800 for providing adaptive enhancement video processing, arranged in accordance with at least some implementations of the present disclosure. As shown in FIG. 8, system 800 includes a central processor 801, a video processor 802, a memory 803, and a video enhancement processor 804. Also as shown, video processor 802 may include or implement video decoder 101, QP comparison module 102, residual values comparison module 103, pixel value transfer module 105, deep learning network 806, and frame merge module 107. For example, deep learning network 806 may implement any deep learning network discussed herein such as a deep learning super-resolution network, a deep learning anti-aliasing network, a deep learning denoising network, etc. Furthermore, video enhancement processor 804 may provide the same processing only using a different, non-deep learning, non-AI based technique as discussed herein. As shown, video enhancement processor 804 may be implemented separately from video processor 802. In some embodiments, video enhancement processor 804 is implemented as part of video processor 802 (e.g., as a hardware component of video processor 802). Furthermore, in the example of system 800, memory 803 may store video data or related content such as video frame data, video block data, video coding modes, deep learning network parameters, frame level QPs, and/or any other data as discussed herein.

As shown, in some embodiments, video decoder 101, QP comparison module 102, residual values comparison module 103, pixel value transfer module 105, deep learning network 806, and frame merge module 107 are implemented via video processor 802. In other embodiments, one or more or portions of video decoder 101, QP comparison module 102, residual values comparison module 103, pixel value transfer module 105, deep learning network 806, and frame merge module 107 are implemented via central processor 801 or another processing unit such as an image processor, a graphics processor, or the like.

Video processor 802 may include any number and type of video, image, or graphics processing units that may provide the operations as discussed herein. Such operations may be implemented via software or hardware or a combination thereof. For example, video processor 802 may include circuitry dedicated to manipulate video frames, video frames data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, one or more or portions of video decoder 101, QP comparison module 102, residual values comparison module 103, pixel value transfer module 105, deep learning network 806, and frame merge module 107 are implemented via an execution unit (EU). The EU may include, for example, programmable logic or circuitry such as a logic core or cores that may provide a wide array of programmable logic functions. In an embodiment, one or more or portions of video decoder 101, QP comparison module 102, residual values comparison module 103, pixel value transfer module 105, deep learning network 806, and frame merge module 107 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 begins at operation 701, where a bitstream is decoded to generate first and second blocks of a video frame having first and second video coding modes. The decode may be based on any suitable video codec and the first and second coding modes may be attained via a decode parameters memory request or the like.

Processing continues at operation 702, where a deep learning network is applied to the first block in response to the first coding mode to generate a first output block. In some embodiments, the first coding mode is any coding mode other than skip mode (i.e., inter coding with no residual information). And the deep learning network is applied responsive to the first block being other than a skip block. In some embodiments, the first block is one of intra coded or inter coded with coded residual information. The deep learning network may be applied to provide any suitable video enhancement processing including super-resolution processing, anti-aliasing processing, or noise reduction processing. In some embodiments, the deep learning network is a deep learning super-resolution network and the first output block is at a second resolution greater than a first resolution of the video frame decoded at operation 701. In some embodiments, the deep learning network is a deep learning anti-aliasing network. In some embodiments, the deep learning network is a deep learning noise reduction network. The deep learning network may have any suitable architecture or topology.

Processing continues at operation 703, where application of the deep learning network to the second block is bypassed and a prior second output block is retrieved for the second block in response to the second coding mode. In the context of super-resolution processing, the second output block is at the second resolution greater than the first resolution of the video frame. Furthermore in such super-resolution processing contexts, retrieving the second output block includes retrieving the second output block based on a prior generated second super-resolution video frame temporally adjacent to the video frame using the motion vector. For example, the temporally adjacent super-resolution video is for a time instance other than the time instance of the video frame. In some embodiments, retrieving the second output block includes accessing pixel samples of the second super-resolution video frame via a location at a horizontal location of the second block adjusted based on the motion vector and scaled using a scaling factor and having a size based on a width of the second block scaled using the scaling factor.

Processing continues at operation 704, where an output video frame corresponding to the video frame based at least on merging the first and second output blocks into the output video frame. For example, the output video frame has the same time instance with respect to the video frame but is enhanced in terms of upsampling, anti-aliasing, or denoise. In the context of super-resolution processing, the video frame is at the first resolution and the output video frame is at a second resolution greater than the first resolution.

In some embodiments, process 700 further includes decoding the bitstream to generate a third block of a second video frame such that the video frame has a first quantization parameter and the second frame has a second quantization parameter less than the first quantization parameter and applying, in response to the second quantization parameter being greater than a threshold, non-deep learning based video processing to the third block to generate a third output block that is enhanced with respect to the third block. In the context of super-resolution processing, the third block is at the first resolution and the third output block is at the second resolution greater than the first resolution at the second resolution. In some embodiments, the non-deep learning based video processing includes video upscaling via interpolation of the third block to generate the third output block. In some embodiments, the interpolation includes one of bilinear interpolation, bicubic interpolation, or Lanczos interpolation and wherein the deep learning network comprises at least one convolutional layer. In some embodiments, applying the deep learning network to the first block, bypassing application of the deep learning network to the second block, and retrieving the prior second output block are in response to the first quantization parameter being less than a threshold. In some embodiments, the bitstream is decoded to generate metadata including the first and second video coding modes and the first and second quantization parameters.

In some embodiments, process 700 further includes decoding the bitstream to generate third and fourth blocks of the video frame that include the first and second video coding modes, respectively, such that the first and second blocks are region of interest blocks and the third and fourth blocks are non-region of interest blocks, applying the deep learning network to the third block in response to the first coding mode to generate a third output block at the second resolution, and bypassing application of the deep learning super-resolution network to the fourth block and retrieving a prior fourth output block at the second resolution for the fourth block in response to the second coding mode such that generating the output video frame comprises merging the third and fourth output blocks into the output video frame. For example, the discussed processing may be performed in the same manner in regions of interest and non-region of interests in a video frame.

Process 700 may be repeated any number of times either in series or in parallel for any number of video blocks, video frames, video segments, or the like. As discussed, process 700 may provide for adaptive enhancement video processing based on frame level quantization parameter and block coding modes.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
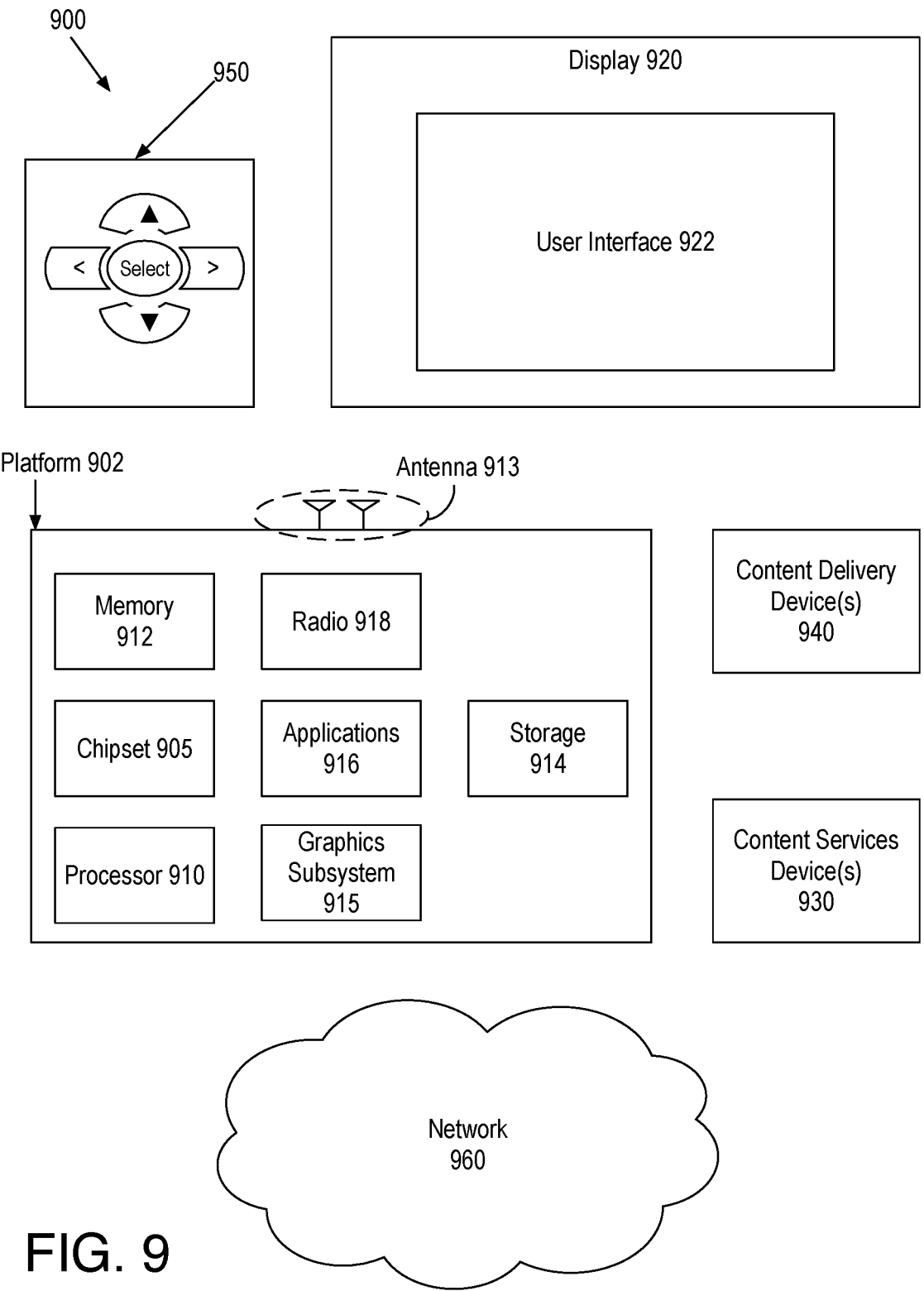
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
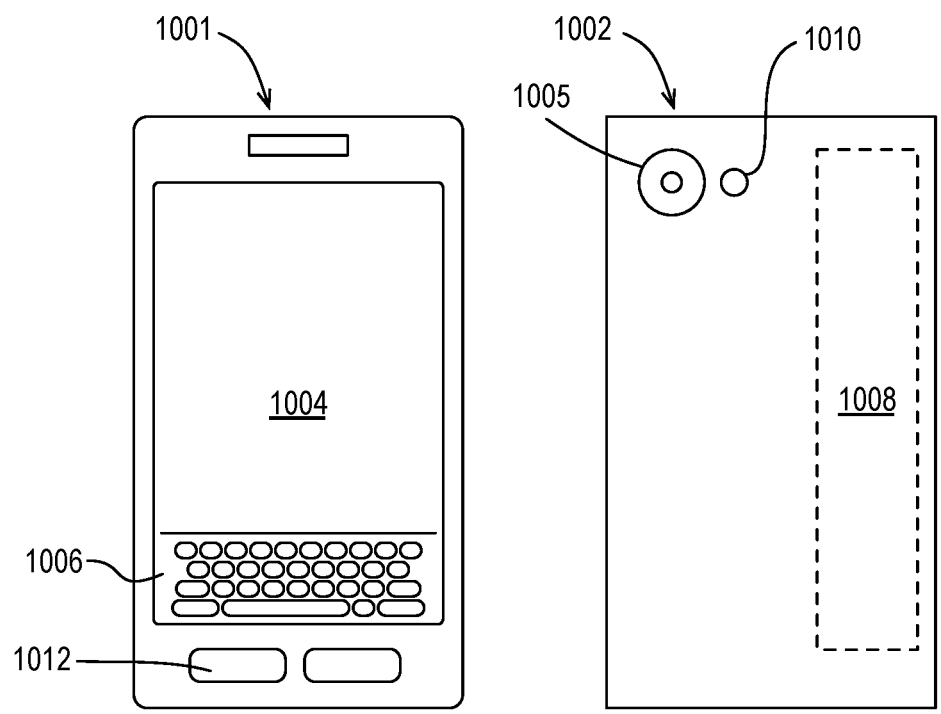
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, system 100 or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

In one or more first embodiments, a method for providing adaptive enhancement video processing comprises decoding a bitstream to generate first and second blocks of a video frame, wherein the first and second blocks comprise first and second video coding modes, respectively, applying a deep learning network to the first block in response to the first coding mode to generate a first output block, bypassing application of the deep learning network to the second block and retrieving a prior second output block for the second block in response to the second coding mode, and generating an output video frame corresponding to the video frame based at least on merging the first and second output blocks into the output video frame.

In one or more second embodiments, further to the first embodiment, the deep learning network comprises a deep learning super-resolution network, and wherein the video frame is at a first resolution and the first output block, the second output block, and the output video frame are at a second resolution greater than the first resolution.

In one or more third embodiments, further to the first or second embodiments, the second video coding mode is inter coded with no coded residual information and the second block has a motion vector corresponding thereto.

In one or more fourth embodiments, further to any of the first through third embodiments, retrieving the second output block comprises retrieving the second output block based on a second super-resolution video frame temporally adjacent to the video frame using the motion vector.

In one or more fifth embodiments, further to any of the first through fourth embodiments, retrieving the second output block comprises accessing pixel samples of the second super-resolution video frame comprising a location at a horizontal location of the second block adjusted based on the motion vector and scaled using a scaling factor and having a size based on a width of the second block scaled using the scaling factor.

In one or more sixth embodiments, further to any of the first through fifth embodiments, the first block is one of intra coded or inter coded with coded residual information.

In one or more seventh embodiments, further to any of the first through sixth embodiments, the method further comprises decoding the bitstream to generate a third block of a second video frame, wherein the video frame comprises a first quantization parameter and the second frame comprises a second quantization parameter less than the first quantization parameter and applying, in response to the second quantization parameter being greater than a threshold, interpolation to the third block to generate a third output block at the second resolution.

In one or more eighth embodiments, further to any of the first through seventh embodiments, applying the deep learning network to the first block, bypassing application of the deep learning network to the second block, and retrieving the prior second output block at the second resolution are in response to the first quantization parameter being less than a threshold.

In one or more ninth embodiments, further to any of the first through eighth embodiments, the interpolation comprises one of bilinear interpolation, bicubic interpolation, or Lanczos interpolation and wherein the deep learning network comprises at least one convolutional layer.

In one or more tenth embodiments, further to any of the first through ninth embodiments, the method further comprises decoding the bitstream to generate metadata comprising the first and second video coding modes and the first and second quantization parameters.

In one or more eleventh embodiments, further to any of the first through tenth embodiments, the method further comprises decoding the bitstream to generate third and fourth blocks of the video frame, wherein the third and fourth blocks comprise the first and second video coding modes, respectively, and wherein the first and second blocks comprise region of interest blocks and the third and fourth blocks comprises non-region of interest blocks, applying the deep learning network to the third block in response to the first coding mode to generate a third output block at the second resolution, and bypassing application of the deep learning super-resolution network to the fourth block and retrieving a prior fourth output block at the second resolution for the fourth block in response to the second coding mode, wherein generating the output video frame comprises merging the third and fourth output blocks into the output video frame.

In one or more twelfth embodiments, further to any of the first through eleventh embodiments, the deep learning network comprises one of a deep learning based anti-aliasing network or a deep learning-based noise reduction network.

In one or more thirteenth embodiments, a device or system includes a memory and a processor to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for providing adaptive enhancement video processing comprising:
    a memory to store at least a portion of a bitstream; and
    one or more processors coupled to the memory, the one or more processors to:
        decode the bitstream to generate a video frame comprising pixel values at a first resolution, wherein the video frame comprises first and second blocks of pixel values at the first resolution, and wherein the first and second blocks comprise first and second video coding modes, respectively;
        apply a deep learning network to the first block in response to the first coding mode to generate a first output block comprising pixel values at a second resolution greater than the first resolution;
        bypass application of the deep learning network to the second block and retrieve a prior second output block comprising pixel values at the second resolution for the second block in response to the second coding mode; and
        generate an output video frame comprising pixel values at the second resolution corresponding to the video frame based at least on a merge of the first and second output blocks into the output video frame.

2. The system of claim 1, wherein the deep learning network comprises a deep learning super-resolution network.

3. The system of claim 2, wherein the second video coding mode is inter coded with no coded residual information and the second block has a motion vector corresponding thereto.

4. The system of claim 3, wherein the one or more processors to retrieve the second output block comprises the one or more processors to retrieve the second output block based on a second super-resolution video frame temporally adjacent to the video frame using the motion vector.

5. The system of claim 4, wherein the one or more processors to retrieve the second output block comprises the one or more processors to access pixel samples of the second super-resolution video frame comprising a location at a horizontal location of the second block adjusted based on the motion vector and scaled using a scaling factor and having a size based on a width of the second block scaled using the scaling factor.

6. The system of claim 3, wherein the first block is one of intra coded or inter coded with coded residual information.

7. The system of claim 2, the one or more processors to:
    decode the bitstream to generate a third block of a second video frame, wherein the video frame comprises a first quantization parameter and the second video frame comprises a second quantization parameter less than the first quantization parameter; and
    apply, in response to the second quantization parameter being greater than a threshold, interpolation to the third block to generate a third output block at the second resolution.

8. The system of claim 7, wherein the one or more processors to apply the deep learning network to the first block, bypass application of the deep learning network to the second block, and retrieve the prior second output block at the second resolution are in response to the first quantization parameter being less than a threshold.

9. The system of claim 7, wherein the interpolation comprises one of bilinear interpolation, bicubic interpolation, or Lanczos interpolation and wherein the deep learning network comprises at least one convolutional layer.

10. The system of claim 7, the one or more processors to:
    decode the bitstream to generate metadata comprising the first and second video coding modes and the first and second quantization parameters.

11. The system of claim 2, the one or more processors to:
    decode the bitstream to generate third and fourth blocks of the video frame, wherein the third and fourth blocks comprise the first and second video coding modes, respectively, and wherein the first and second blocks comprise region of interest blocks and the third and fourth blocks comprises non-region of interest blocks;
    apply the deep learning network to the third block in response to the first coding mode to generate a third output block at the second resolution; and
    bypass application of the deep learning super-resolution network to the fourth block and retrieve a prior fourth output block at the second resolution for the fourth block in response to the second coding mode, wherein the one or more processors to generate the output video frame comprises the one or more processors to merge the third and fourth output blocks into the output video frame.

12. The system of claim 1, wherein the deep learning network comprises one of a deep learning based anti-aliasing network or a deep learning-based noise reduction network.

13. A method for providing adaptive enhancement video processing comprising:
    decoding a bitstream to generate a video frame comprising pixel values at a first resolution, wherein the video frame comprises first and second blocks of pixel values at the first resolution, and wherein the first and second blocks comprise first and second video coding modes, respectively;

applying a deep learning network to the first block in response to the first coding mode to generate a first output block comprising pixel values at a second resolution greater than the first resolution;

bypassing application of the deep learning network to the second block and retrieving a prior second output block for the second block in response to the second coding mode; and generating an output video frame corresponding to the video frame based at least on merging the first and second output blocks into the output video frame.

14. The method of claim 13, wherein the deep learning network comprises a deep learning super-resolution network, and wherein the second video coding mode is inter coded with no coded residual information and the second block has a motion vector corresponding thereto, and the first block is one of intra coded or inter coded with coded residual information.

15. The method of claim 14, wherein retrieving the second output block comprises retrieving the second output block based on a second super-resolution video frame temporally adjacent to the video frame using the motion vector by accessing pixel samples of the second super-resolution video frame comprising a location at a horizontal location of the second block adjusted based on the motion vector and scaled using a scaling factor and having a size based on a width of the second block scaled using the scaling factor.

16. The method of claim 14, further comprising:
decoding the bitstream to generate a third block of a second video frame, wherein the video frame comprises a first quantization parameter and the second video frame comprises a second quantization parameter less than the first quantization parameter; and applying, in response to the second quantization parameter being greater than a threshold, interpolation to the third block to generate a third output block at the second resolution.

17. At least one non-transitory machine readable medium comprising a plurality of instructions that, in response to being executed on a computing device, cause the computing device to provide adaptive enhancement video processing by:
decoding a bitstream to generate of a video frame comprising pixel values at a first resolution, wherein the video frame comprises first and second blocks of pixel values at the first resolution, and wherein the first and second blocks comprise first and second video coding modes, respectively;

applying a deep learning network to the first block in response to the first coding mode to generate a first output block comprising pixel values at a second resolution greater than the first resolution;

bypassing application of the deep learning network to the second block and retrieving a prior second output block for the second block in response to the second coding mode; and generating an output video frame corresponding to the video frame based at least on merging the first and second output blocks into the output video frame.

18. The non-transitory machine readable medium of claim 17, wherein the deep learning network comprises a deep learning super-resolution network, and wherein the second video coding mode is inter coded with no coded residual information and the second block has a motion vector corresponding thereto, and the first block is one of intra coded or inter coded with coded residual information.

19. The non-transitory machine readable medium of claim 18, wherein retrieving the second output block comprises retrieving the second output block based on a second super-resolution video frame temporally adjacent to the video frame using the motion vector by accessing pixel samples of the second super-resolution video frame comprising a location at a horizontal location of the second block adjusted based on the motion vector and scaled using a scaling factor and having a size based on a width of the second block scaled using the scaling factor.

20. The non-transitory machine readable medium of claim 18, further comprising instructions that, in response to being executed on the computing device, cause the computing device to provide adaptive enhancement video processing by:
decoding the bitstream to generate a third block of a second video frame, wherein the video frame comprises a first quantization parameter and the second video frame comprises a second quantization parameter less than the first quantization parameter; and applying, in response to the second quantization parameter being greater than a threshold, interpolation to the third block to generate a third output block at the second resolution.

* * * * *

UNITED STATES PATENT AND TRADEMARK OFFICE
CERTIFICATE OF CORRECTION

| | |
|---|---|
| PATENT NO. | : 11,889,096 B2 |
| APPLICATION NO. | : 16/914083 |
| DATED | : January 30, 2024 |
| INVENTOR(S) | : Chen Wang et al. |

It is certified that error appears in the above-identified patent and that said Letters Patent is hereby corrected as shown below:

In the Claims

In Column 26, Line 17, Claim 7, delete "the one" and insert -- wherein the one --, therefor.

In Column 26, Line 37, Claim 10, delete "the one" and insert -- wherein the one --, therefor.

In Column 26, Line 41, Claim 11, delete "the one" and insert -- wherein the one --, therefor.

Signed and Sealed this
Fifteenth Day of October, 2024

Katherine Kelly Vidal
*Director of the United States Patent and Trademark Office*